UNITED STATES PATENT OFFICE.

NOEL STATHAM, OF BOONTON, NEW JERSEY, ASSIGNOR TO INDUSTRIAL CHEMICAL COMPANY, OF NEW YORK, N. Y., A CORPORATION OF NEW YORK.

GLAZED PAPER AND COATING COMPOSITION THEREFOR.

1,209,222.   Specification of Letters Patent.   Patented Dec. 19, 1916.

No Drawing.   Application filed April 26, 1916.   Serial No. 93,651.

*To all whom it may concern:*

Be it known that I, NOEL STATHAM, a subject of the King of Great Britain, residing at Boonton, Morris county, New Jersey, have made a certain new and useful Invention Relating to Glazed Paper and Coating Compositions Therefor, of which the following is a specification.

This invention relates especially to sizing compositions comprising light precipitated chalk or other calcium carbonate loading or sizing material and to glazed paper, cloth or other fabric coated therewith.

Light precipitated chalk, such as is disclosed in the Statham Patent 1,178,962, of April 11, 1916, is highly desirable for incorporation in sizing compositions for use on glazed paper, etc., and this material or similar calcium carbonate sizing material can with advantage be used when combined with casein or other suitable alkaline or neutral size. This light precipitated chalk has the decided advantage that it is extremely light and bulky, so that it adds a correspondingly greater thickness or bulk to the sized paper and its lightness and extremely finely divided condition also promote its suspension in the sizing composition so as to correspondingly promote the uniformity of the resultant coating on the paper, etc., which is of special importance when tints or colors are incorporated with the coating composition. This light precipitated chalk can also be readily and cheaply manufactured with a clear white color and promotes the quick drying of coating compositions in which it is used in considerable quantities so as to be more desirable for these reasons than clays or the satin white sizing materials generally used.

The light precipitated chalk may be incorporated with the casein, glue, starch or other sizing solution which may be made up in any suitable way so as to have an alkaline or neutral reaction and this or other suitable light calcium carbonate sizing or loading material may be used in connection with more or less clay, satin white, blanc fixe, or other loading material in some cases.

An illustrative sizing composition may comprise 15 pounds of casein dissolved in a water solution of 15 pounds of borax with which are incorporated 120 pounds of such light precipitated chalk and ½ pint or so of ammonia.

Another illustrative composition may comprise 15 pounds of casein dissolved in a solution of 15 pounds of borax and with which are incorporated 70 pounds of light precipitated chalk and 50 pounds of English or other clay and ½ pint of ammonia.

Another illustrative composition may comprise 15 pounds of casein dissolved in a water solution of 15 pounds of borax with which are incorporated 30 pounds of such light precipitated chalk, 10 pounds of other finely divided calcium carbonate loading material, 40 pounds of satin white and 50 pounds of clay, the foregoing formulas being intended to give glossy finished paper when applied in the usual way in paper coating machines so as to form a substantially uniform smooth coating on the paper which is subsequently dried and calendered.

Another illustrative composition which is adapted to give a semi-dull finish when not specially calendered may comprise 15 pounds of casein dissolved in a solution of 15 pounds of borax with which are incorporated 40 pounds of light precipitated chalk or other calcium carbonate loading material, 40 poungs of English clay and 40 pounds of blanc fixe or barium sulfate loading material.

This invention has been described in connection with a number of illustrative materials, proportions, formulas, orders of steps and methods of preparation and use, to the details of which disclosure the invention is not of course to be limited, since

What is claimed as new and what is desired to be secured by Letters Patent is set forth in the appended claims.

1. The glazed paper coated with sizing comprising casein and incorporated inorganic loading material consisting substantially of light precipitated chalk.

2. The glazed paper coated with sizing comprising incorporated inorganic loading material consisting in greater part of light precipitated chalk.

3. The coated paper coated with a sizing composition comprising dissolved organic size and incorporated inorganic loading material consisting in considerable part of finely divided calcium carbonate loading material.

4. The coated fabric coated with sizing comprising inorganic loading material consisting in considerable part of finely divided calcium carbonate loading material.

5. The paper coating composition, adapted for coating glazed paper, which consists of an alkaline solution of casein and incorporated inorganic loading material consisting substantially of light precipitated chalk which had when dry a weight of not more than eighteen pounds per cubic foot.

6. The coating composition, adapted for coating glazed paper, comprising an alkaline solution of size containing casein with which is incorporated inorganic loading material containing a considerable proportion of light precipitated chalk together with satin white and clay.

7. The coating composition, adapted for coating paper, comprising an alkaline solution of size with which is incorporated inorganic loading material containing a considerable proportion of light precipitated chalk together with satin white.

8. The coating composition, adapted for coating fabric, comprising a sizing solution substantially free from acid capable of undesirably reacting on calcium carbonate and incorporated finely divided inorganic loading material containing a considerable proportion of light precipitated chalk which had when dry a weight of not more than twenty pounds per cubic foot.

9. The coated paper coated with a sizing composition comprising inorganic coating material consisting in considerable part of finely divided light precipitated chalk which had when dry a weight of not more than twenty pounds per cubic foot.

NOEL STATHAM.

Witnesses:
J. WRENCH,
HENRY E. GOWARD